(12) United States Patent
Vigneau

(10) Patent No.: US 9,789,978 B2
(45) Date of Patent: Oct. 17, 2017

(54) SYSTEM FOR FOLLOWING THE HANDLING OF AN AIRCRAFT ENGINE

(71) Applicant: Airbus Operations (S.A.S.), Toulouse (FR)

(72) Inventor: Philippe Vigneau, Seysses (FR)

(73) Assignee: AIRBUS OPERATIONS (S.A.S.), Toulouse (FI)

( * ) Notice: Subject to any disclaimer, the term of this patent is extended or adjusted under 35 U.S.C. 154(b) by 13 days.

(21) Appl. No.: 14/737,140

(22) Filed: Jun. 11, 2015

(65) Prior Publication Data

US 2015/0367962 A1 Dec. 24, 2015

(30) Foreign Application Priority Data

Jun. 23, 2014 (FR) ...................................... 14 55807
Jun. 11, 2015 (FR) ...................................... 15 55304

(51) Int. Cl.
*B66F 7/12* (2006.01)
*B64F 5/00* (2017.01)
(Continued)

(52) U.S. Cl.
CPC .............. *B64F 5/0036* (2013.01); *B64F 5/50* (2017.01); *F01D 25/285* (2013.01); *F02C 7/20* (2013.01);
(Continued)

(58) Field of Classification Search
USPC ...... 254/89 H; 29/281.1, 281.3, 281.4, 281.5
See application file for complete search history.

(56) References Cited

U.S. PATENT DOCUMENTS

| | | | | |
|---|---|---|---|---|
| 94,680 A | * | 9/1869 | Wells | B61K 5/00 104/32.1 |
| 2,767,995 A | * | 10/1956 | Stout | B62D 49/08 180/21 |

(Continued)

FOREIGN PATENT DOCUMENTS

| | | |
|---|---|---|
| EP | 0341579 A2 | 11/1989 |
| FR | 2449057 A1 | 9/1980 |
| FR | 2665938 A1 | 2/1992 |

OTHER PUBLICATIONS

French Search Report for Application No. 1455807 dated Feb. 19, 2015.

*Primary Examiner* — Larry E Waggle, Jr.
*Assistant Examiner* — Alvin Grant
(74) *Attorney, Agent, or Firm* — Jenkins, Wilson, Taylor & Hunt, P.A.

(57) ABSTRACT

A system for following the handling of an aircraft engine includes a cradle which supports the engine and stands which are spread out under the cradle. Each stand includes a seating configured to secure the stand on the ground, an actuating cylinder secured to the seating and having a translationally mobile piston, a fixing structure secured to the exterior end of the piston and configured to be fixed to the cradle, and a fluid source which causes the piston to be raised or lowered. Each stand also includes a detector designed to detect an inappropriate movement of the piston and a blocking which blocks the piston from moving when the detector detects an inappropriate movement of the piston. Thus, when an inappropriate movement of the piston is detected, the blocking blocks the movement of the cradle and prevents it from tipping.

13 Claims, 4 Drawing Sheets

(51) Int. Cl.
    *F01D 25/28*     (2006.01)
    *F02C 7/20*     (2006.01)
    *B64F 5/50*     (2017.01)

(52) U.S. Cl.
    CPC ...... *F05D 2230/64* (2013.01); *F05D 2230/68* (2013.01)

(56) References Cited

U.S. PATENT DOCUMENTS

| | | | | |
|---|---|---|---|---|
| 2,931,519 A * | 4/1960 | Beach | ............... | B66F 7/0625 |
| | | | | 254/134 |
| 2,958,508 A * | 11/1960 | Martinez | ............... | B66F 3/24 |
| | | | | 248/354.5 |
| 4,461,490 A * | 7/1984 | Fritel | ............... | B66C 23/78 |
| | | | | 212/302 |
| 7,213,841 B2 * | 5/2007 | Manzini | ............... | B60P 1/5433 |
| | | | | 212/302 |
| 2006/0266885 A1 * | 11/2006 | Hardaker | ............... | B64F 5/50 |
| | | | | 244/119 |
| 2007/0189884 A1 * | 8/2007 | Masters | ............... | B64F 5/50 |
| | | | | 414/431 |

* cited by examiner

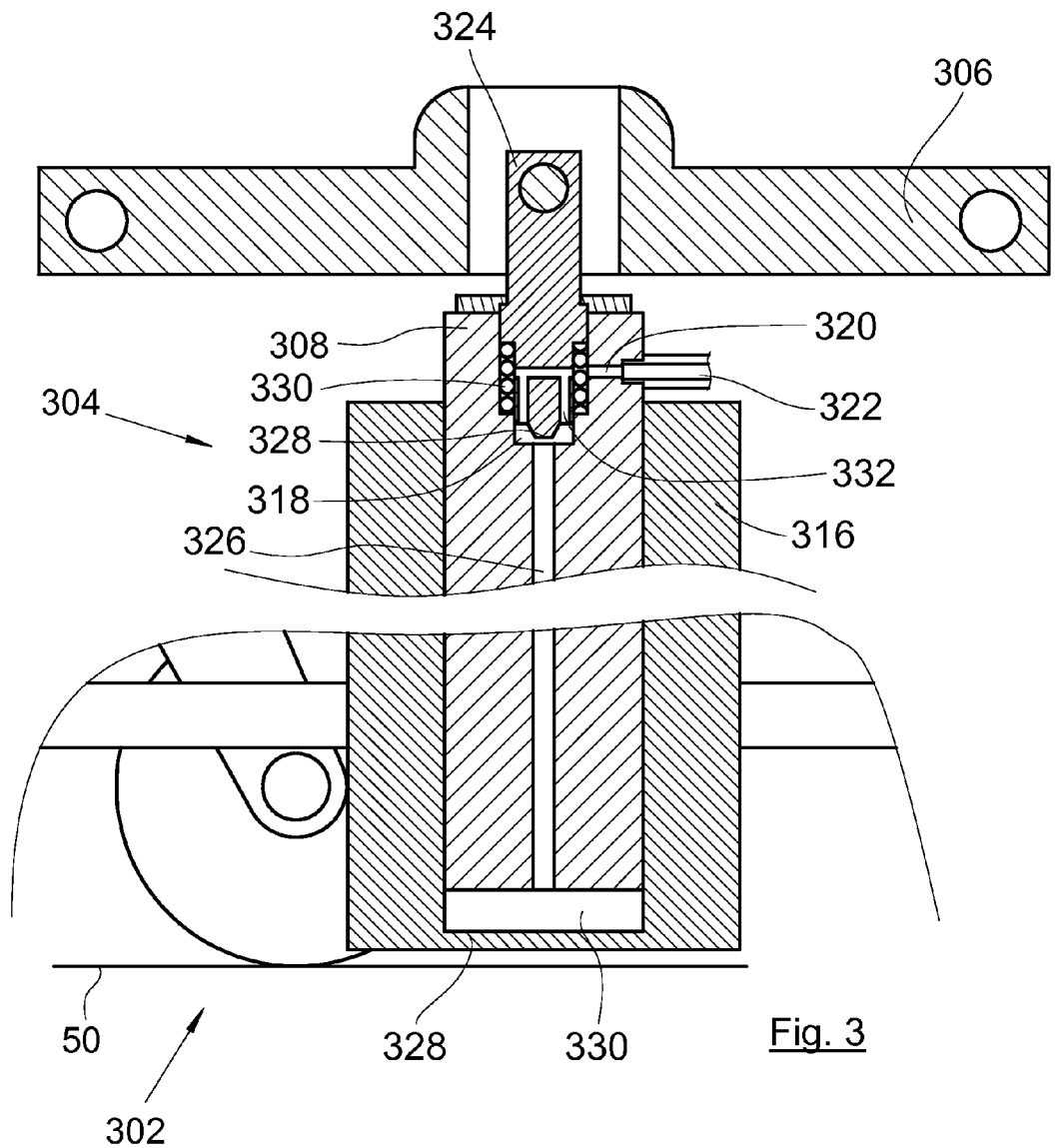
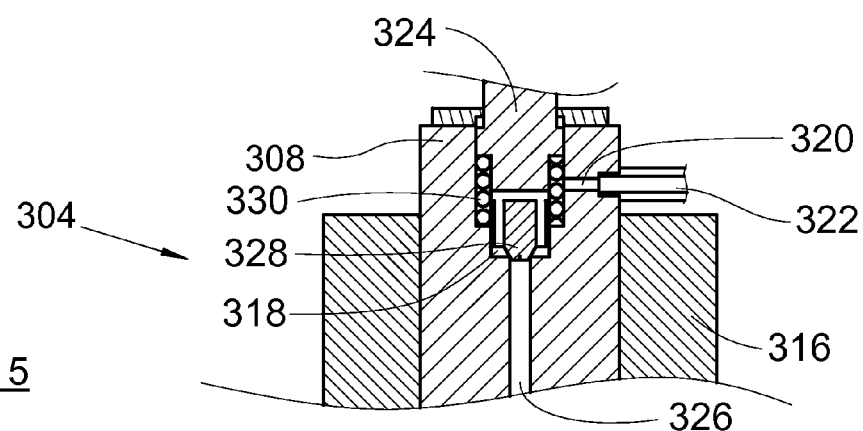
Fig. 3
Fig. 5

SYSTEM FOR FOLLOWING THE HANDLING OF AN AIRCRAFT ENGINE

CROSS-REFERENCE TO RELATED APPLICATION

This application claims the benefit of and priority to French patent application No. 14 55807 filed on Jun. 23, 2014, and French patent application No. 15 55304 filed on Jun. 11, 2015 the entire disclosures of which are incorporated by reference herein.

TECHNICAL FIELD

The present disclosure relates to a system for following the handling of an aircraft engine.

BACKGROUND

At the present time, in order to remove or install an aircraft engine, the technicians use a handling system known by its English name of "bootstrapping".

FIG. 1 shows an aircraft engine 10 which is fixed on a cradle 20 which in this instance consists of a horizontal frame and of vertical support posts to which the engine 10 is fixed. The aircraft comprises a pylon 30 to which the engine 10 is to be fixed or from which it is to be detached.

The handling system 100 is intended to raise the engine 10 from the ground 50 to the pylon 30 or to lower it from the pylon 30 to the ground 50 according to whether the engine 10 is to be fixed to the pylon 30 or detached therefrom.

The handling system 100 comprises a fixing assembly 102, in this instance girders, which are fixed to the pylon 30 and a set of flexible strapping elements 40 (chains, straps, etc.) which are mounted between the fixing assembly 102 and the cradle 20. The collection of flexible strapping elements 40 for example takes the form of lifting tackle that allows the cradle 20 to be moved vertically.

When one of the elements of the handling system 100 breaks, the cradle 20 becomes unbalanced, and this may cause the engine 10 to tip.

SUMMARY

It is an object of the present disclosure to propose an engine-handling following system that does not have the disadvantages of the prior art and which in particular ensures that the cradle bearing the engine is held in position even if one element of the handling system breaks.

To this end, there is proposed an engine-handling following system for the handling of an aircraft engine, the system comprising:
- a cradle intended to support the engine,
- a plurality of stands designed to be spread out under the cradle,
- each stand comprising:
  - seating intended for seating the stand on the ground,
  - an actuating cylinder secured to the seating and having a translationally mobile piston,
  - fixing or fixation structure secured to the exterior end of the piston and intended to be fixed to the cradle,
  - a supply intended alternately to cause the piston to be raised or lowered,
  - a detector designed to detect an inappropriate movement of the piston, and
  - blocking intended to block the movement of the piston when the detector detects an inappropriate movement of the piston.

Such an engine-handling following system therefore allows the actuating cylinder an inappropriate movement of which has been detected to be blocked, thus also blocking the cradle in position and preventing the engine from tipping.

Typically, the inappropriate movement of the piston is a collapse thereof when the cradle is being raised or is in a raised position.

Advantageously, for each piston, the detector is an accelerometer fixed to the piston or the fixing structure, and the inappropriate movement of the piston is detected by measuring an acceleration above a threshold using the accelerometer.

Advantageously, for each piston, the detector is a load cell arranged to measure the axial load applied on the piston, and the detection of an inappropriate movement of the piston consists of a load measured by the load cell above a threshold.

Advantageously, each stand has three feet and three wheels, each wheel having a suspension system and being fixed to a foot so that the foot remains some distance off the ground whereas the wheel rests on the ground.

Advantageously, the actuating cylinder is actuated by a fluid, and the supply comprises a fluid source and supply intended to supply the actuating cylinder with fluid when the piston is intended to be raised, and to allow the reflux of the fluid from the actuating cylinder when the piston is intended to be lowered.

Advantageously, the actuating cylinder has a tube with an end wall inside which tube the piston moves, the space between the end wall and the end of the piston constituting a compression chamber, and the supply further comprises:
- a housing made in the exterior end of the piston,
- a supply bore which opens into the housing and outside of the piston and is connected to the fluid source, and
- a drilling disposed between the housing and the compression chamber and configured to allow fluid communication therebetween.

Advantageously, the blocking comprises a plugging intended alternately to adopt a blocking position in which it prevents the fluid from flowing between the actuating cylinder and the fluid source, and a free position in which it allows the fluid to flow between the actuating cylinder and the fluid source.

Advantageously, the detector comprises the plugging and a return which forces the plugging into the free position.

Advantageously, the plugging is intended to plug the supply bore or the drilling.

Advantageously, the plugging takes the form of a slider one of the ends of which is provided with a plug and which is capable of vertical translational movement in the housing between the blocking position in which the plug plugs the opening of the drilling in the housing, and the free position in which the plug does not plug it.

Advantageously, the slider is secured to the fixing structure.

The disclosure herein also proposes a complete engine-handling assembly for handling an aircraft engine comprising a pylon, the engine being fixed on a cradle, the complete handling assembly comprising:
- a handling system intended to raise the engine from the ground to the pylon or lower it from the pylon to the ground and comprising a fixing assembly fixed to the pylon and a set of flexible strapping elements mounted between the fixing assembly and the cradle, and an engine-handling following system according to one of the above alternative forms.

BRIEF DESCRIPTION OF THE DRAWINGS

The above-mentioned features of the disclosure herein, together with others, will become more clearly apparent from reading the following description of one exemplary embodiment, the description being given in conjunction with the attached drawings, among which:

FIG. 3 is a section on a vertical plane through a tripod of the engine-handling following system of FIG. 2;

FIG. 5 shows a detail of a section on a vertical plane through the engine-handling following system.

DETAILED DESCRIPTION

Figure 1:
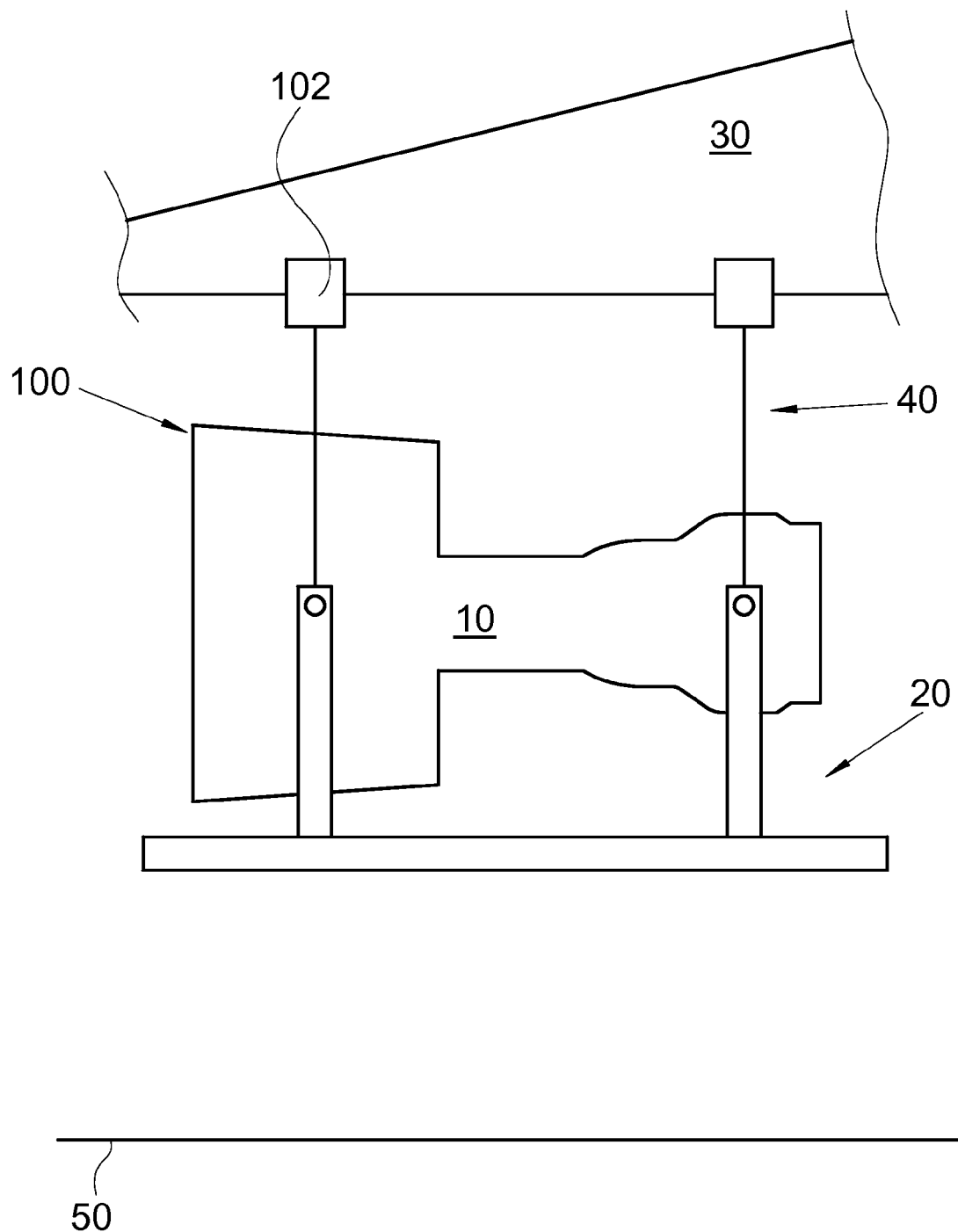
FIG. 1 depicts a schematic side view of an installation of the prior art.
Figure 2:
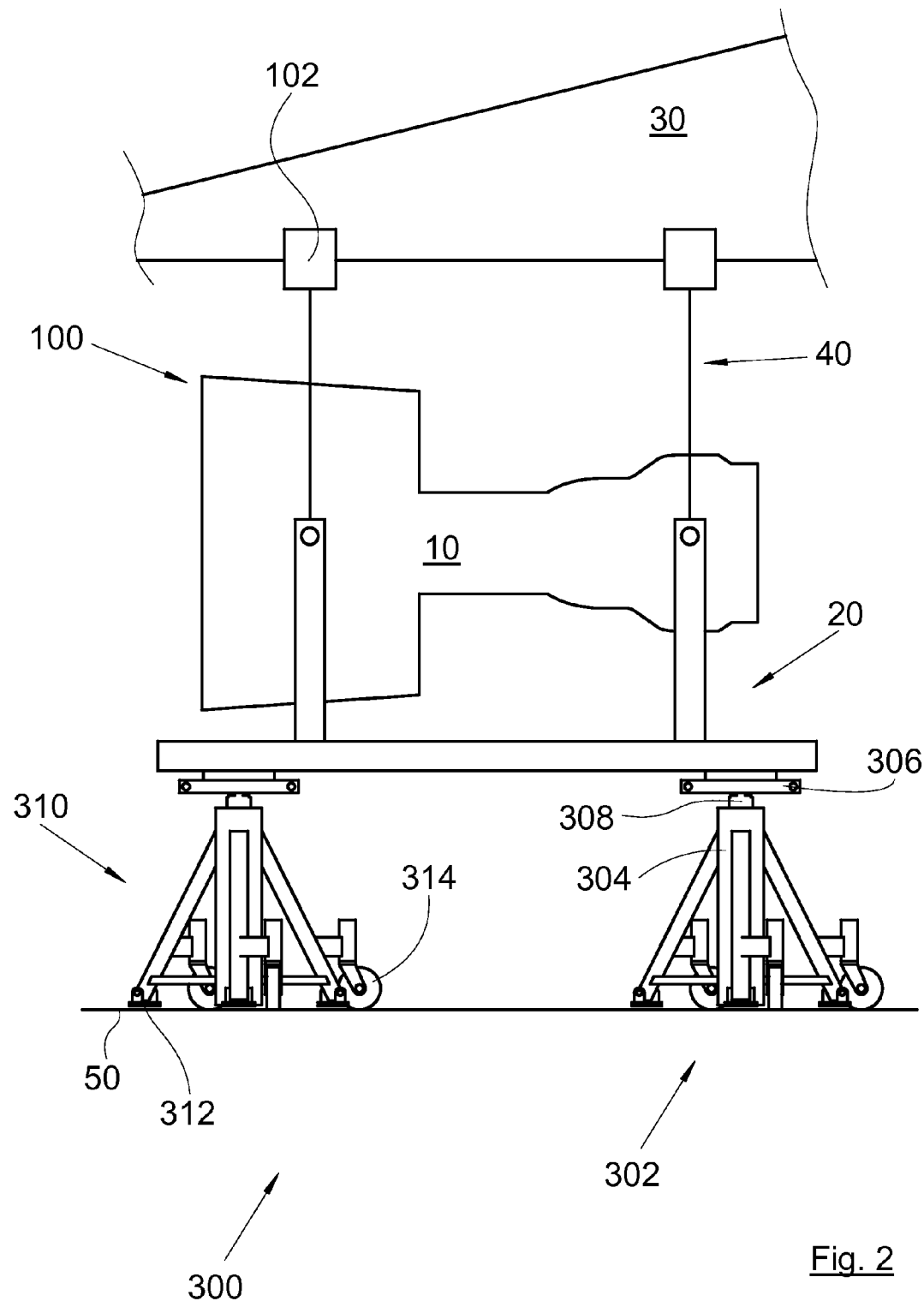
FIG. 2 depicts a schematic side view of an installation having an engine-handling following system according to the disclosure herein.

As with FIG. 1, FIG. 2 shows an aircraft engine 10 which is fixed on a cradle 20. The aircraft comprises a pylon 30 to which the engine 10 is to be fixed or from which it is to be detached.

FIG. 2 also shows a handling system 100 designed to raise the engine 10 from the ground 50 to the pylon 30 or lower it from the pylon 30 to the ground 50 and which comprises a fixing assembly 102 fixed to the pylon 30 and a set of flexible strapping elements 40 (chains, straps, etc.) or rigid strapping elements (rods) mounted between the fixing assembly 102 and the cradle 20.

FIG. 2 shows an engine-handling following system 300 which comprises, in addition to the cradle 20, a plurality of stands 302 spread out under the cradle 20. Typically, at least four stands 302 are provided, these being spread at the corners of the cradle 20. Additional stands 302 may be arranged underneath the cradle 20 along the sides thereof.

Each stand 302 comprises seating 310 intended to seat the stand 302 on the ground 50, an actuating cylinder 304 secured to the seating 310 and having a piston 308 capable of vertical translational movement, and fixing structure 306, here a plate, secured to the exterior end of the piston 308 and intended to be fixed to the cradle 20. The exterior end of the piston 308 is the end that leaves the actuating cylinder 304.

Each stand 302 comprises a supply intended alternately to allow the piston 308 to be raised or lowered.

Each stand 302 also comprises detector intended to detect an inappropriate movement of the piston 308.

Each stand 302 comprises blocking intended to block the movement of the piston 308 when the detector detects an inappropriate movement of the piston 308.

When an engine 10 needs to be handled, the cradle 20 is fixed to the engine 10, then each stand 302 is arranged under the cradle 20, then each actuating cylinder 304 is actuated and pressurized in order to place the associated fixing structure 306 underneath and against the cradle 20. Raising of the fixing structure 306 comes to a halt when contact is made and because each actuating cylinder 304 is not powerful enough to raise the laden cradle 20.

During the raising of the cradle 20 in normal operation, the handling system 100 lifts the cradle 20 and, because of the pressure always present in the actuating cylinders 304, each one lengthens to follow the upward movement of the cradle 20 without ever raising it.

If an incident occurs (for example if a flexible or rigid strapping element breaks), part of the cradle 20 will dip violently. The piston 308 supporting this part will then undergo an inappropriate movement (in this case a collapse) which will be detected by the detector.

In response to this detection, the blocking come and block the piston 308, which will stabilize everything thereby preventing the cradle 20 and the engine 10 from tipping.

When the cradle 20 is being lowered in normal operation, the handling system 100 lowers the cradle 20 and the pistons 308 retract under the action of the pressure applied by the cradle 20 to follow this lowering, thereby expelling the fluid toward the supply.

If an incident occurs (for example if a flexible or rigid strapping element breaks), part of the cradle 20 will dip violently. The piston 308 supporting this part will then undergo an inappropriate movement (in this instance too great a collapse) which will be detected by the detector.

In response to this detection, the blocking comes and block the piston 308 and this will stabilize everything thereby preventing the cradle 20 and the engine 10 from tipping.

Each stand 302 takes the form of a tripod with three feet 312 and three wheels 314, each wheel having a suspension system and being fixed to a foot 312 in such a way that the foot 312 remains some distance off the ground 50 whereas the wheel 314 rests on the ground 50. The wheels 314 and the feet 312 are the seating 310.

Thus, when an incident occurs, the sudden dropping of the cradle 20 causes the impacted tripod 302 to be lowered, through the collapse of the suspension of its wheels 314. When the extent of lowering becomes sufficient, the feet 312 which are lowered simultaneously come into contact with the ground 50 to stabilize the tripod 302.

The distance between each foot 312 and the ground 50 at the outset is of the order of 5 mm to 15 mm.

In the disclosure herein embodiment depicted in the figures, each actuating cylinder 304 is actuated by a fluid, preferably oil, and the supply comprises a fluid source and supply the actuating cylinder 304 with fluid when the piston 308 is moving upwards, and to allow the reflux of the fluid from the actuating cylinder 304 when the piston 308 is moving downwards.

The detector may for example be an accelerometer fixed to one of the moving parts (piston 308, fixing structure 306) and an acceleration above a threshold will trigger the blocking. In this embodiment, the detector comprises also a control unit arranged to read the acceleration of each accelerometer and to compare it to the threshold.

FIG. 3 shows in section on a vertical plane an enlargement of a stand 302.

In the disclosure herein embodiment depicted in FIG. 3, the piston 308 is simple, but the piston 308 may be telescopic according to the height it has to reach.

The actuating cylinder 304 has a tube 316 with an end wall 328 and inside which tube the piston 308 moves. The space between the end wall 328 and the interior end of the piston 308, which is the opposite end to the exterior end, constitutes a compression chamber 330. When pressurized fluid is introduced into the compression chamber 330, the piston 308 will begin to leave the tube 316 and lengthen. When fluid is extracted from the compression chamber 330, the piston 308 will retract into the tube 316 and shorten.

The piston 308 has, at its exterior end, a housing 318 and a supply bore 320 which opens into the housing 318 and outside of the piston 308 where a supply pipe 322 is connected. The fluid source is connected to the supply pipe 322 and the fluid is supplied to the actuating cylinder 304 or removed therefrom via this supply pipe 322.

The piston 308 also has a drilling 326 which runs between the housing 318 and the compression chamber 330.

Thus, when the piston 308 is to be lengthened, pressurized fluid from the supply pipe 322 passes in succession through the supply bore 320, the housing 318, the drilling 326 to reach the compression chamber 330.

Conversely, when the piston 308 is to be shortened, pressurized fluid from the compression chamber 330 passes in succession through the drilling 326, the housing 318 and the supply bore 320 to reach the supply pipe 322 from where it is removed.

The supply thus here comprises or consists of the supply bore 320, of the housing 318, of the drilling 326 and of the fluid source.

In general, the blocking is produced in the form of a plugging 324 intended alternately to adopt a blocking position in which it prevents the fluid from flowing between the actuating cylinder 304 and the fluid source, and a free position in which it allows the fluid to flow between the actuating cylinder 304 and the fluid source.

In this embodiment of the disclosure herein which has been depicted in FIG. 3, the plugging 324 is intended to plug the supply bore 320 or the drilling 326, thus preventing fluid from being introduced towards the compression chamber 330 or fluid from being extracted towards the supply pipe 322. The plugging thus prevents the circulation of the fluid and therefore the movement of the piston 308. Contrastingly, when the plugging is not in the plugging position, the fluid may circulate freely and therefore move the piston 308.

The plugging may be moved by any suitable structure such as, for example, a motor controlled by the detector.

In the embodiment of the disclosure herein that has been depicted here, the plugging takes the form of a slider 324, of which one of the ends is provided with a plug 328 and which is capable of vertical translational movement in the housing 318, namely parallel to the axis of the piston 308, between the blocking position in which the plug 328 plugs the opening of the drilling 326 in the housing 318, and the free position in which the plug 328 does not plug it.

The plug 328 in this instance is the bottom end of the slider 324 and the drilling 326 is made in the lower part of the housing 318.

FIG. 3 shows the slider 324 in the free position and FIG. 5 shows the slider 324 in the blocking position.

In the disclosure herein embodiment depicted in FIG. 3, the slider 324 is secured to the fixing structure 306, and a return 330 forces the slider 324 into the free position.

The return 330 here adopts the form of a compression spring positioned between a surface of the housing 318 and a surface of the slider 324.

The detector is therefore in this instance the plugging 324, namely the slider 324, and the return 330.

Operation is therefore as follows: when an incident occurs, the cradle 20 bears heavily against the fixing structure 306 and this tends to push in the slider 324 and, if the force applied by the cradle 20 is greater than the return force of the return 330, the slider 324 moves into the blocking position plugging the opening of the drilling 326, thereby blocking the piston 308.

The passage from the free position into the blocking position is thus governed by the maximum force that the return 330 can absorb. An inappropriate movement is therefore determined here according to the force applied to the slider 324.

From a general point of view, for each piston 308, the detector is a load cell arranged to measure the axial load applied on the piston, either directly, or through the fixation structure 306 or the slider 324, and a control unit arranged to compare the load so measured to a load threshold, and the detection of an inappropriate movement of the piston 308 consists of a load measured by the load cell above a threshold, which causes the passage into the blocking position. In the embodiment of the disclosure herein presented here, le load cell is the slider 324 and the unit control is the return 330, but in another embodiment it can be a load cell delivering an electrical signal proportional to the axial load and the control unit can be an electronic comparator.

To ensure the passage of the fluid between the supply bore 320 and the housing 318, the slider 324 has, at the plug 328, canals 332 opening via one end into the housing 318 and via another end facing the supply bore 320, in this instance crossing the space in which the compression spring 330 is situated.

The fixing structure 306 is mounted with freedom to rotate about a horizontal axis on the slider 324.

Figure 4:
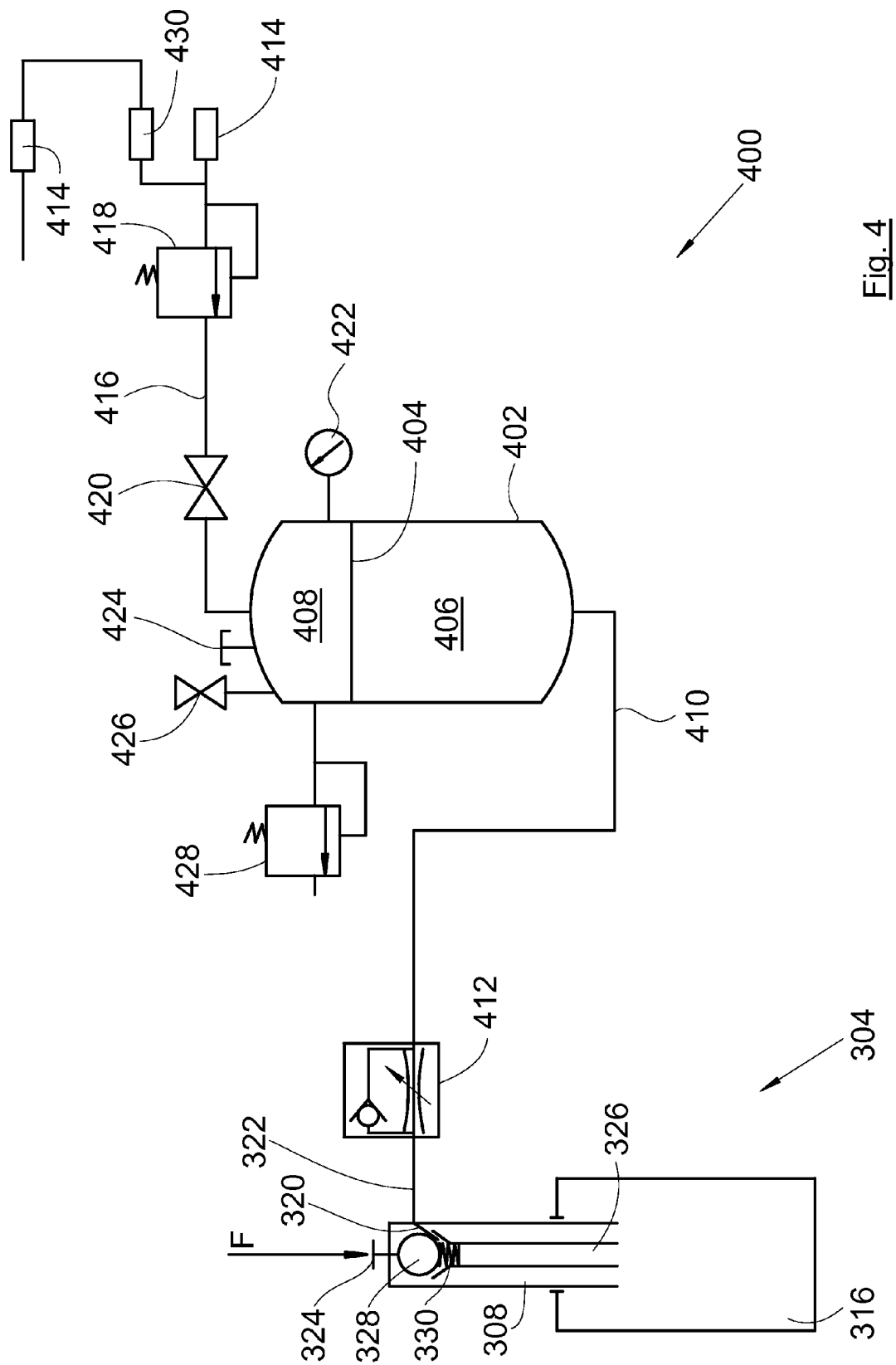
FIG. 4 shows one example of a hydraulic diagram used in the disclosure herein.

FIG. 4 shows one example of a hydraulic installation representative of the fluid source 400 connected to the supply pipe 322.

Each stand 302 of the engine-handling following system 300 comprises such a fluid source 400.

The actuating cylinder 304 is depicted schematically with the plug 328 which is controlled by the force F applied by the cradle 20 to the slider 324.

The fluid source 400 comprises a reservoir 402 secured to the seating 310 and comprising a membrane 404 dividing the reservoir 402 into a first chamber 406 containing the fluid (oil) and a second chamber 408 containing a gas (air or nitrogen).

A first pipe 410 comes from the first chamber 406 and meets the supply pipe 322 via a one-way flow restrictor 412.

The one-way flow restrictor 412 allows the fluid to pass in both directions, but with a maximum rate of flow from the first chamber 406 towards the supply pipe 322, namely when the piston 308 is moving upwards, and with a regulated rate of flow from the supply pipe 322 towards the first chamber 406, namely when the piston 308 is moving downwards.

The upwards movement of each piston 308 is limited by its coming to press against the cradle 20 and by the fact that it is not powerful enough to lift same.

The downwards movement of each piston 308 is achieved by a regulated bleed of fluid through the one-way flow restrictor 412.

The fluid source 400 also comprises a coupler 414 intended to allow connection to a source of pressurized gas (cylinder or mains supply).

The coupler 414 is connected to the second chamber 408 by a second pipe 416 through a pressure regulator 418 and an isolating valve 420.

A pressure gauge 422 is also provided at the second chamber 408 to monitor the pressure in this second chamber 408.

A filling plug 424, a venting device and a safety valve 428 are also provided at the second chamber 408.

When the number of pressure tappings is insufficient for connecting each coupler 414 to the pressurized-gas source, the fluid sources 400 may be connected in series one after the other. To do that, each fluid source 400 comprises a bypass coupler 430 arranged between the coupler 414 and the pressure regulator 418. Thus, the coupler 414 of a first fluid source 400 is connected to the pressurized-gas source, the coupler 414 of the next fluid source 400 is connected to the bypass coupler 430 of the first fluid source 400, and so on in succession.

The handling system 100 and the engine-handling following system 300 constitute a complete handling assembly for handling the engine 10.

While at least one exemplary embodiment of the present invention(s) has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A system for following handling of an aircraft engine, the system comprising:
    a cradle which supports the engine; and
    a plurality of stands designed to be spread out under the cradle, each stand comprising:
        a seating configured to secure each stand on a ground,
        an actuating cylinder secured to the seating and having a translationally mobile piston,
        a fixing structure secured to an exterior end of the piston and configured to be fixed to the cradle,
        a supply which causes the piston to be raised or lowered,
        a detector designed to detect an inappropriate movement of the piston, and
        a blocking which blocks the piston from moving when the detector detects an inappropriate movement of the piston.

2. The system according to claim 1, wherein the inappropriate movement of the piston is a collapse during a raising of the cradle.

3. The system according to claim 1, wherein, for each piston, the detector comprises an accelerometer fixed to one of the piston or the fixing structure and the detection of an inappropriate movement of the piston comprises an acceleration, measured by the accelerometer, above a threshold.

4. The system according to claim 1, wherein, for each piston, the detector comprises a load cell arranged to measure an axial load applied on the piston, and detection of an inappropriate movement of the piston comprises a load, measured by the load cell, above a threshold.

5. The system according to claim 1, wherein each stand has three feet and three wheels, each wheel having a suspension system and being fixed to a corresponding foot, so the corresponding foot remains some distance off the ground and the wheel contacts the ground.

6. The system according to claim 1, wherein the actuating cylinder is actuated by a fluid, and a fluid source is configured to supply the actuating cylinder with the fluid when the piston is raised and to allow a reflux of the fluid from the actuating cylinder when the piston is lowered.

7. The system according to claim 6, wherein the actuating cylinder has a tube with an end wall, inside which tube the piston moves, a space between the end wall and an end of the piston constituting a compression chamber, and the stands further comprise:
    a housing in the exterior end of the piston,
    a supply bore configured to allow fluid communication between the housing and an outside of the piston, wherein the supply bore is connected to the fluid source, and
    a drilling configured to allow fluid communication between the housing and the compression chamber.

8. The system according to claim 7, wherein the blocking comprises a plugging configured to adopt a blocking position, in which the plugging prevents the fluid from flowing between the actuating cylinder and the fluid source, and a free position, in which the plugging allows the fluid to flow between the actuating cylinder and the fluid source.

9. The system according to claim 8, wherein the detector comprises the plugging and a return which forces the plugging into the free position during normal operation.

10. The system according to claim 9, wherein the plugging is configured to plug the supply bore or the drilling.

11. The system according to claim 10, wherein the plugging is a slider, one end of which is provided with a plug, and
    wherein the slider is configured for vertical translational movement in the housing between the blocking position, in which the plug plugs an opening of the drilling in the housing, and the free position, in which the plug does not plug the opening of the drilling in the housing.

12. The system according to claim 11, wherein the slider is secured to the fixing structure.

13. A complete engine-handling assembly for handling an aircraft engine comprising a pylon, the engine being fixed on a cradle, the complete handling assembly comprising:
    a handling system configured to raise the engine from a ground to the pylon or to lower the engine from the pylon to the ground, the handling system comprising a fixing assembly fixed to the pylon and a set of flexible strapping elements mounted between the fixing assembly and the cradle; and
    a system according to claim 1.

* * * * *